(12) United States Patent
Lee

(10) Patent No.: US 8,094,339 B2
(45) Date of Patent: Jan. 10, 2012

(54) DIGITAL CAMERA AND PRINTING METHOD THEREOF

(75) Inventor: Liu-Pin Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 798 days.

(21) Appl. No.: 12/200,849

(22) Filed: Aug. 28, 2008

(65) Prior Publication Data
US 2009/0225181 A1  Sep. 10, 2009

(30) Foreign Application Priority Data
Mar. 5, 2008  (CN) .......................... 2008 1 0300472

(51) Int. Cl.
*G06F 15/00* (2006.01)
*G03G 15/10* (2006.01)
(52) U.S. Cl. ........................................ 358/1.15; 399/58
(58) Field of Classification Search ................. 358/1.15, 358/1.13, 1.14, 1.16, 1.6, 296, 507, 506, 358/1.2, 2.1; 348/222.1, 207.2, 240.99; 399/58, 399/260; 715/243, 274
See application file for complete search history.

(56) References Cited

U.S. PATENT DOCUMENTS

| | | | |
|---|---|---|---|
| 6,469,770 B2 * | 10/2002 | Hoshino et al. | 355/40 |
| 7,265,868 B2 | 9/2007 | Takahashi | |
| 2001/0040684 A1 * | 11/2001 | Takahashi | 358/1.2 |

* cited by examiner

*Primary Examiner* — Saeid Ebrahimi Dehkordy
(74) *Attorney, Agent, or Firm* — Altis Law Group, Inc.

(57) ABSTRACT

A digital camera includes a printing system including an image receiving module for receiving a first image, a selection module, a availability, a comparison module, a size module, an image forming module, and an image output module. The selection module can allow selection of a desired print size for the first image. The availability module can determining available paper sizes of a printer connected to the digital camera. The comparison module can determine whether the printer supports the desired print size input to the selection module. The size module is capable of selecting a paper size from the available paper sizes bigger than the desired print size, if the printer doesn't support the desired print size. And then, the image forming module resizes the first image to form a second image. The image output module is capable of outputting the second image to the printer.

11 Claims, 3 Drawing Sheets

DIGITAL CAMERA AND PRINTING METHOD THEREOF

TECHNICAL FIELD

The present invention relates to cameras and, particularly, to a printing method of a digital camera that permit users to print an image with a desired size.

DESCRIPTION OF THE RELATED ART

Commonly, in order to print images captured by a digital camera, the camera has to be connected to a computer first, and the computer then communicates with a printer and the images are printed. However, it would be more convenient and desirable to print the images without using a computer, and the PictBridge technology was developed for printing image files without a computer.

Cameras and printers that use PictBridge technology, allow printing images from a memory card in a digital camera directly to a printer. Once a PictBridge digital camera is connected to a compliant printer, print options appear on the camera monitor. Then users can select a paper size of the printer, such as A3, A4, B4 and so on, to print the images. However, printers usually only support a few paper sizes, thus limiting choices to users.

What is needed, therefore, is a digital camera and a printing method thereof that can overcome the above-described problem.

SUMMARY

In an exemplary embodiment, a digital camera includes an image sensor and a printing system. The printing system includes an image receiving module, a selection module, an availability module, a comparison module, a size module, an image forming module, and an image output module. The image receiving module is capable of receiving a first image. The selection module is capable of allowing selection of a desired print size for the first image. The availability module is capable of determining available paper sizes of a printer connected to the digital camera. The comparison module is configured for determining whether the printer supports the desired print size input to the selection module. The size module is capable of selecting a paper size, from the available paper sizes, bigger than the desired print size if the printer doesn't support the desired print size. The image forming module is configured for resizing the first image to form a second image including the first image therein, if the printer doesn't support the desired print size, wherein the ratio of the size of the second image to the size of the first image therein is equal to the ratio of the paper size selected by the size module to the desired print size. The image output module is capable of receiving the second image, and outputting the received image to the printer.

BRIEF DESCRIPTION OF THE DRAWINGS

Many aspects of the present digital camera and related printing method can be better understood with reference to the following drawings. The components in the drawings are not necessarily drawn to scale, the emphasis instead being placed upon clearly illustrating the principles of the present digital camera and related printing method.

DETAILED DESCRIPTION OF THE EMBODIMENTS

Embodiments of the present invention will now be described in detail below, with reference to the accompanying drawings.

Figure 1:
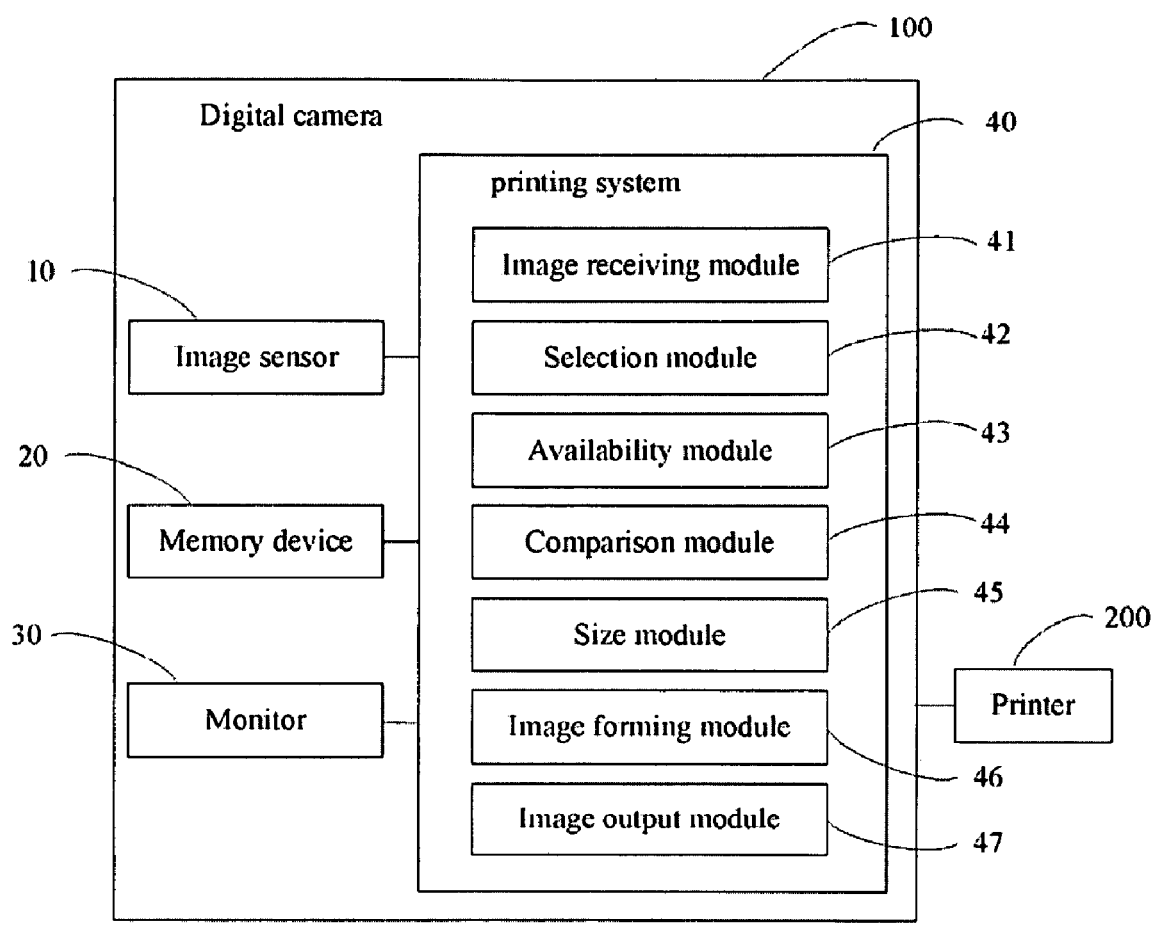
FIG. 1 is a functional block diagram of a digital camera according to an exemplary embodiment.
Figure 3:
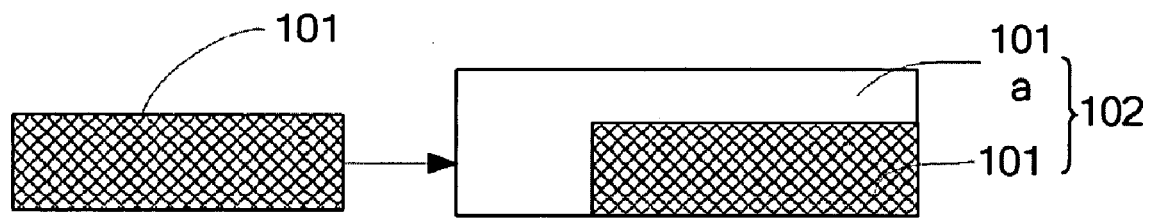
FIG. 3 is explanatory view of the method of forming a new image used by the method of FIG. 2.

Referring to FIG. 1 and FIG. 3, a digital camera 100, according to an exemplary embodiment, is shown. The digital camera 100 can communicate with a printer 200. The digital camera 100 includes an image sensor 10, a memory device 20, a monitor 30, and a printing system 40.

The image sensor 10, the memory device 20, and the monitor 30 are electrically coupled to the printing system 40. The image sensor 10 and the memory device 20 can provide images to be printed to the printing system 40. The monitor 30 is capable of displaying available paper size items of the printer 200.

The printing system 40 includes an image receiving module 41, a selection module 42, an availability module 43, a comparison module 44, a size module 45, an image forming module 46, and an image output module 47.

The image receiving module 41 is capable of receiving an image 101 to be printed. The image 101 can be obtained from the image sensor 10 or the memory device 20.

The selection module 42 is capable of allowing selection of a desired print size for the image 101. The desired print size is a size that users want the image 101 to be printed out. For example, the desired print size can be 3 inches×5 inches, 4 inches×6 inches, and so on. The desired print size should not bigger than the biggest available paper size of the printer 200, if it is, the availability module 43, for example, can alert the user to make another selection by displaying a message on the monitor 300.

The availability module 43 is capable of determining available paper sizes of the printer 200 connected to the digital camera 100. The available paper sizes usually include A4, A3, B4, 8 inches×10 inches, 4 inches×6 inches and so on. In the present embodiment, the printer 200 has two available paper sizes, 8 inches×10 inches and 4 inches×6 inches.

The comparison module 44 is configured for determining whether the printer 200 supports the desired print size input to the selection module 42. If the printer 200 has an available paper size equal to the desired print size, the desired print size is supported by the printer 200, otherwise, the printer 200 cannot support the desired print size.

The size module 45 is configured for selecting a paper size from the available paper sizes of the printer 200. To be specific, if the desired print size is supported by the printer 200, the size module 45 will select a paper size equal to the desired print size and send the image 101 to the image output module 47. If the desired print size is not supported by the printer 200, the size module 45 will select a paper size from the available paper sizes bigger than the desired print size, and send the image 101 to the image forming module 46. In the present embodiment, if the desired print size is not supported by the printer 200, the size module 45 will select an available paper size which is the smallest of the available paper size bigger than the desired print size as the print paper size.

If the desired print size is not supported by the printer 200, the image forming module 46 will resize the image 101 to form a new image 102 including the image 101 to be printed therein, and then send the new image 102 to the image output module 47. The other area 101a of the image 102 can be designed having a same color. In the present embodiment, the area 101a is white. The new image 102 satisfies the following conditions:

$$a1/a2=A1/A2 \quad (1)$$

$$b1/b2=B1/B2 \quad (2)$$

wherein, a1 is the length of new image 102, b1 is the width of the new image 102, a2 is the length of the image 101, the b2 is the width of the image 101, A1 is the length of the selected available paper size, B1 is the width of the selected available paper size, A2 is the length of the desired print size, and B2 is the width of the desired print size.

The image output module 47 is configured for outputting a received image to the printer 200 to print it. The received image can be the image 101 or the new image 102, base on whether the printer 200 support the desire print size of the image 101.

Figure 2:
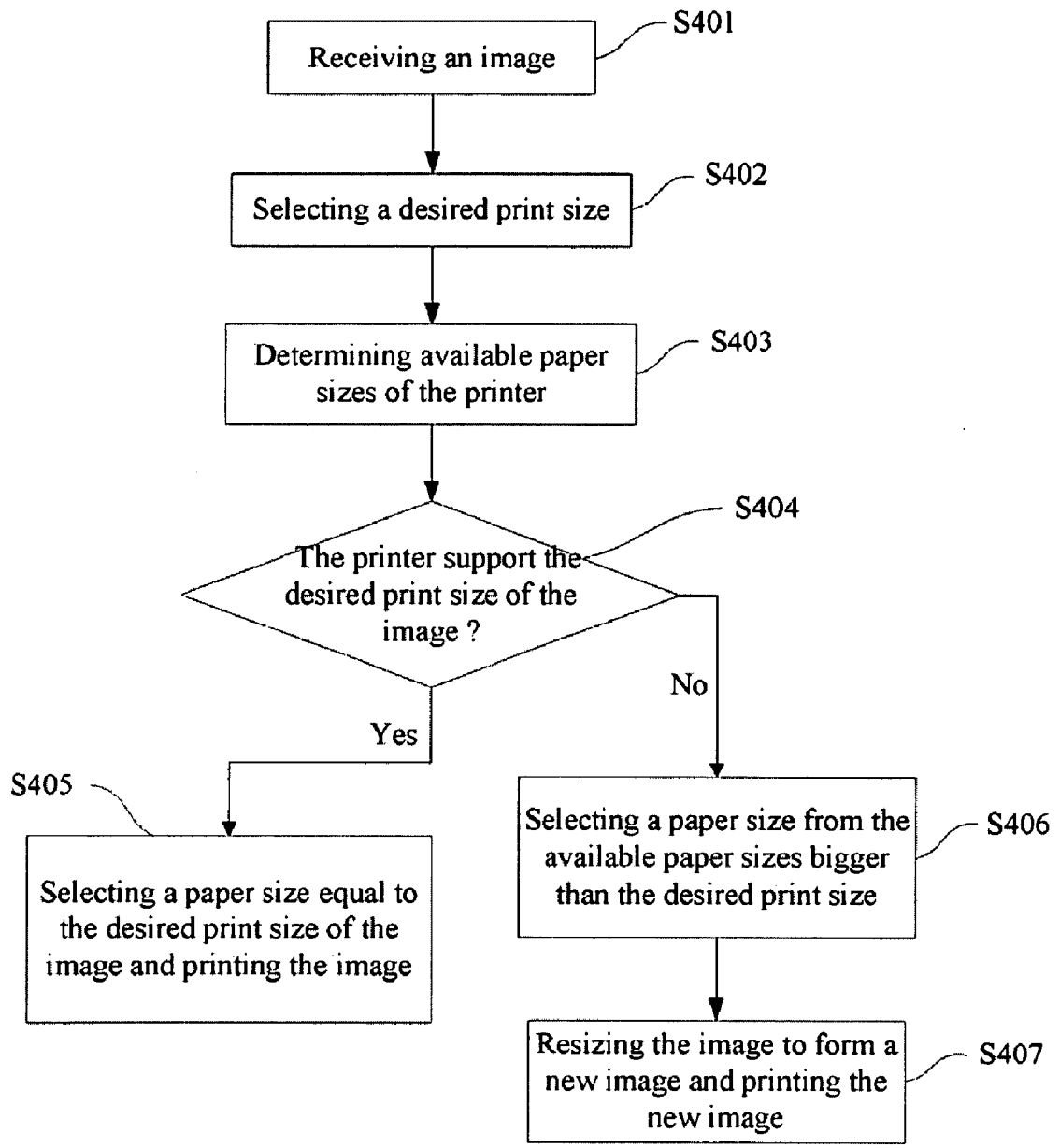
FIG. 2 is a flowchart of a printing method of the digital camera of FIG. 1 according to an exemplary embodiment.

Referring to FIG. 2, a flowchart of a printing method of the digital camera 100 is shown. The method includes the following steps.

Step S401, receiving an image 101 to be printed. In the present embodiment, the image receiving module 41 of the printing system 40 performs this step. The image 101 can be obtained from the image sensor 10 or the memory device 20 of the digital camera 100.

Step S402, selecting a desired print size for the image 101. The desired print size is a size that users want the image 101 to be printed out. For example, the desired print size can be 3 inches×5 inches, 4 inches×6 inches, and so on. The desired print size should not bigger than the biggest available paper size of the printer 200.

Step S403, determining available paper sizes of the printer 200 connected to the digital camera 100. In the present embodiment, the printer 200 has two available paper sizes, 8 inches×10 inches and 4 inches×6 inches.

Step S404, determining whether the printer 200 support the selected desired print size of the image 101. In the present embodiment, the comparison module 44 is configured for determining whether the printer 200 support the desired print size of image 101 have been set.

Step S405, selecting a paper size equal to the desired print size of the image 101, if the printer 200 support the desired print size, and printing the image 101.

Step S406, selecting a paper size from the available paper sizes bigger than the desired print size, if the printer 200 don't support the desired print size. Preferably, if the desired print size is not supported by the printer 200, the paper size can be selected to be the smallest of the available paper sizes bigger than the desired print size.

Step S407, resizing the image 101 to form a new image 102 including the image 101 therein after the Step S406 and printing the new image 102, wherein, the ratio of the size of the new image 102 to the size of the image 101 therein is equal to the ratio of the selected paper size in Step S406 to the desired print size selected in Step S402.

In the present embodiment, the image 101 with a desired print size unsupported by the printer 200 is resized to form a new image 102. So, the image 101 also can be printed out with a desired print size by controlling the ratio of the size of new image 102 to the size of the image 101 therein. Accordingly, the image 101 can be printed out with a desired print size.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A digital camera capable of communicating with a printer, comprising:
an image sensor; and
a printing system, the printing system comprising:
an image receiving module capable of receiving a first image;
a selection module capable of allowing selection of a desired print size for the first image;
an availability module capable of determining available paper sizes of a printer connected to the digital camera;
a comparison module capable of determining whether the printer supports the desired print size input to the selection module;
a size module capable of selecting a paper size, from the available paper sizes, bigger than the desired print size if the printer doesn't support the desired print size;
an image forming module for resizing the first image to form a second image including the first image therein if the printer doesn't support the desired print size, wherein the ratio of the size of the second image to the size of the first image therein is equal to the ratio of the paper size selected by the size module to the desired print size; and
an image output module capable of receiving the second image, and outputting the received image to the printer;
wherein the second image satisfies the following conditions: (1) a1/a2=A1/A2; and (2) b1/b2=B1/B2, wherein a1 is the length of second image, b1 is the width of the second image, a2 is the length of the first image including in the second image, the b2 is the width of the first image including in the second image, A1 is the length of the selected paper size, B1 is the width of the selected paper size, A2 is the length of the desired print size, and B2 is the width of the desired print size.

2. The digital camera as claimed in claim 1, wherein the size module is also capable of selecting a paper size equal to the desired print size, if the printer supports the desired print size, and the image output module is also capable of receiving the first image when the printer support the desired print size.

3. The digital camera as claimed in claim 1, wherein the digital camera further includes a memory device, the first image is obtained from the image sensor or the memory device.

4. The digital camera as claimed in claim 1, wherein the size module will select an available paper size which is the smallest of the available paper sizes bigger than the desired print size as the paper size.

5. The digital camera as claimed in claim 1, wherein the other area of the second image excepting the first image therein has a same color.

6. The digital camera as claimed in claim 5, wherein the other area of the second image excepting the first image therein is white.

7. A printing method of a digital camera, the digital camera capable of communicating with a printer, the method comprising:
receiving a first image to be printed;
selecting a desired print size for the first image;
determining available paper sizes of the printer connected to the digital camera;

determining whether the printer supports the selected desired print size of the first image;

selecting a paper size from the available paper sizes bigger than the desired print size, if the printer doesn't support the desired print size; and resizing the first image to form a second image including the first image therein if the printer doesn't support the desired print size, and printing the second image;

wherein the second image satisfies the following conditions: (1) $a1/a2=A1/A2$; and (2) $b1/b2=B1/B2$, wherein a1 is the length of second image, b1 is the width of the second image, a2 is the length of the first image including in the second image, the b2 is the width of the first image including in the second image, A1 is the length of the selected paper size, B1 is the width of the selected paper size, A2 is the length of the desired print size, and B2 is the width of the desired print size.

8. The method as claimed in claim 7, wherein the method further comprising a step of selecting a paper size equal to the desired print size of the first image if the printer supports the desired print size, and printing the first image.

9. The method as claimed in claim 7, wherein the paper size is selected from the smallest of the available paper sizes bigger than the desired print size.

10. The method as claimed in claim 7, wherein the other area of the second image excepting the first image therein has a same color.

11. The method as claimed in claim 10, wherein the other area of the second image excepting the first image therein is white.

* * * * *